United States Patent Office 3,517,083
Patented June 23, 1970

3,517,083
POLYBLENDS
Ival O. Salyer, Dayton, Ohio, assignor to Monsanto Company, a corporation of Delaware
No Drawing. Continuation-in-part of application Ser. No. 778,587, Dec. 8, 1958. This application Dec. 12, 1961, Ser. No. 158,872
Int. Cl. C08f 29/24
U.S. Cl. 260—878                          19 Claims

ABSTRACT OF THE DISCLOSURE

Vinyl chloride polymer compositions having improved impact strength are provided by blends of 1–50 parts by weight of a solid ethylene/vinyl acetate copolymer and 99–50 parts by weight of a vinyl chloride polymer. The vinyl chloride polymer may contain up to 15 percent by weight of a copolymerizable monomer and the blends may be prepared by polymerizing the vinyl chloride monomer formulation in admixture with the preformed ethylene/vinyl acetate copolymer or by mechanically blending the two polymers.

REFERENCE TO RELATED APPLICATIONS

The present application is a continuation-in-part of copending application Ser. No. 778,587, filed Dec. 8, 1958, now abandoned.

This invention relates to polyblends and more particularly relates to blends of vinyl chloride polymers and solid ethylene-vinyl acetate copoymers.

An object of the invention is to provide novel polyblends.

Another object is to provide rigid vinyl chloride polymer compositions having improved impact strength.

Another object is to provide flexible vinyl chloride polymer compositions containing a novel polymeric plasticizer.

Another object is to provide vinyl chloride polymer compositions having improved processability.

A further object is to provide processes for preparing novel polyblends comprising vinyl chloride polymers.

These and other objects are attained by blending 50–99 parts by weight of a vinyl chloride polymer with, correspondingly, 50–1 parts by weight of a solid ethylene-vinyl acetate copolymer having a combined vinyl acetate content of 15–85% by weight.

The following examples are given to illustrate the invention. Unless otherwise specified, quantities are mentioned on a weight basis and the ethylene/vinyl acetate ratios shown are the monomer ratios employed in preparing the copolymers. (The amount of vinyl acetate chemically-combined in the copolymer is about 2–5% less than its percentage of the monomer charge, e.g., an ethylene-vinyl acetate (40:60) copolymer has a combined vinyl acetate content of about 55–58%.) PVC designates polyvinyl chloride, and EVA designates an ethylene-vinyl acetate copolymer. The specific viscosities of PVC's are measured as solutions of 0.4 gram of the polymer in 100 ml. of cyclohexanone at 25° C.; the specific viscosities of EVA's are measured as solutions of 0.1% of the copolymers in xylene at 100° C.

EXAMPLE I

Part A

Prepare a series of polyblends in the following manner. Mix 90 parts of PVC having a specific viscosity of 0.48 with 10 parts of EVA (70:30) having a specific viscosity of 0.110, 2 parts of tin mercaptide stabilizer, 1 part of stearic acid, and 0.5 part of di-t-butyl-p-cresol. Mill the mixture at about 170° C. for 5 minutes in preparing Polyblend A–1, 15 minutes in preparing Polyblend A–2, and 25 minutes in preparing Polyblend A–3. Compression mold test specimens by heating for 4 minutes at 185° C. and then compressing for 1 minute at 185° C. Properties of the polyblends are shown in Table I.

Part B

Prepare a series of polyblends by repeating Part A except for substituting an EVA (60:40) having a specific viscosity of 0.104 for the EVA (70:30). Mill for 5 minutes in preparing Polyblend B–1, 15 minutes in preparing Polyblend B–2, and 25 minutes in preparing Polyblend B–3. Properties of the polyblends are shown in Table I.

Part C

Prepare a series of polyblends by repeating Part A except for substituting an EVA (50:50) having a specific viscosity of 0.109 for the EVA (70:30). Mill for 5 minutes in preparing Polyblend C–1, 15 minutes in preparing Polyblend C–2, and 25 minutes in preparing Polyblend C–3. Properties of the polyblends are shown in Table I.

Part D

Prepare a series of polyblends by repeating Part A except for substituting an EVA (40:60) having a specific viscosity of 0.080 for the EVA (70:30). Mill for 5 minutes in preparing Polyblend D–1, 15 minutes in preparing Polyblend D–2, and 25 minutes in preparing Polyblend D–3. Properties of the polyblends are shown in Table I.

TABLE I

| Polyblend | Izod impact strength (ft. lbs./ in. notch) | Tensile strength at yield (p.s.i.) | Tensile modulus (p.s.i.×10⁻⁵) |
|---|---|---|---|
| A–1 | 6.8 | 5,430 | 3.0 |
| A–2 | 21.8 | 5,430 | 2.8 |
| A–3 | 21.7 | 5,460 | 3.0 |
| B–1 | 11.4 | 4,700 | 2.6 |
| B–2 | 18.9 | 5,580 | 3.0 |
| B–3 | 16.6 | 5,740 | 2.8 |
| C–1 | 25.3 | 5,500 | 2.7 |
| C–2 | 24.0 | 5,390 | 2.8 |
| C–3 | 24.0 | 5,200 | 2.7 |
| D–1 | 24.0 | 4,500 | 2.5 |
| D–2 | 25.4 | 4,650 | 2.5 |
| D–3 | 24.0 | 4,920 | 2.5 |

As demonstrated above, good physical properties are obtained when the polyblends of the invention are milled for 5–15 minutes, and these properties are retained during additional mechanical working.

EXAMPLE II

Part A

Mix 95 parts of PVC having a specific viscosity of 0.48 with 5 parts of EVA (40:60) having a weight average molecular weight of 80,000 and with 1 part of a tin mercaptide stabilizer. Mill the mixture for 5 minutes at 170° C. on 6″ x 12″ Thropp rolls to form Polyblend E–1. Compression mold test specimens from the polyblend. Properties of the polyblend are shown in Table II.

Part B

Prepare Polyblend E–2 by repeating Part A except for mixing 90 parts of the PVC with 10 parts of the EVA. Properties of the polyblend are shown in Table II.

Part C

Prepare Polyblend E–3 by repeating Part A except for mixing 85 parts of the PVC with 15 parts of the EVA. Properties of the polyblend are shown in Table II.

TABLE II

| Polyblend | Izod impact strength (ft. lbs./in. notch) | Tensile strength at fail (p.s.i.) | Elongation at fail (percent) | Flexural strength (p.s.i.) |
| --- | --- | --- | --- | --- |
| E-1 | 1.2 | 4,896 | 84 | 9,742 |
| E-2 | 12.1 | 3,780 | 25 | 6,531 |
| E-3 | 8.1 | 1,439 | 18 | 2,816 |

Polyblend E-2 was tested for Clash-Berg data to determine its rigidity. Clash-Berg data include (1) the brittle temperature ($T_f$), i.e., the temperature at which the stiffness modulus is 135,000 p.s.i., (2) the rubber temperature ($T_{2000}$), i.e., the temperature at which the stiffness modulus is 2000 p.s.i., and (3) the Stifflex range, i.e., the difference between $T_{2000}$ and $T_f$. Polyblend E-2 has a $T_f$ of 67° C., a $T_{2000}$ of 88.5° C., and a Stifflex range of 21.5° C.

EXAMPLE III

Mix 80 parts of PVC having a specific viscosity of 0.48 with 20 parts of an EVA (45:55) having an intrinsic viscosity of 1.22 and with 1 part of a tin mercaptide stabilizer. Mill the mixture for 5 minutes at 170° C. on 6" x 12" Thropp rolls to form Polyblend F. Compression mold test specimens from the polyblend. Properties of the polyblend are shown in Table III.

TABLE III

Izod impact strength (ft. lbs./in. notch)—5.6
Tensile strength at yield (p.s.i.)—1550
Tensile strength at fail (p.s.i.)—1516
Elongation at yield (percent)—5
Elongation at fail (percent)—17
Flexural strength (p.s.i.)—3075
Flexural deflection at yield (in.)—0.34

EXAMPLE IV

Part A

Mix 80 parts of PVC having a specific viscosity of 0.48 with 20 parts of an EVA (35:65) having a specific viscosity of 0.103 and with 1 part of a tin mercaptide stabilizer. Mill the mixture for 5 minutes at 170° C. on 6" x 12" Thropp rolls to form Polyblend G-1. Compression mold test specimens from the polyblend. Properties of the polyblend are shown in Table IV.

Part B

Prepare Polyblend G-2 by repeating Part A except for mixing 70 parts of the PVC with 30 parts of the EVA. Properties of the polyblend are shown in Table IV.

TABLE IV

| Polyblend | Izod impact strength (ft. lbs./in. notch) | Tensile strength at fail (p.s.i.) | Elongation at fail (percent) |
| --- | --- | --- | --- |
| G-1 | 19.6 | 3,002 | 75 |
| G-2 | 16.4 | 2,080 | 106 |

Polyblend G-1 has a $T_f$ of 57.5° C., a $T_{2000}$ of 87.5° C., and a Stifflex range of 30° C.

EXAMPLE V

Part A

Prepare Polyblend H-1 from the following polymerization recipe:

Component: Parts
Water _____ 160
Vinyl chloride _____ 100
EVA (45:55) [1] _____ 10
Methyl cellulose _____ 0.35
Lauroyl peroxide _____ 0.25

[1] Specific viscosity—0.302.

Charge the water, methyl cellulose, and lauroyl peroxide to a suitable reaction vessel. Then add a solution of the EVA in vinyl chloride and heat at 50° C. for 16 hours to polymerize the vinyl chloride. Incorporate 2 parts of a tin mercaptide stabilizer and mill the mixture at 165° C. Polyblend H-1 is an intimate admixture of EVA, PVC/EVA graft copolymer, and PVC. Properties of molded specimens of the polyblend are shown in Table V.

Part B

Prepare Polyblend H-2 by repeating Part A except for adding 10 parts of cyclohexane to the initial charge to the reaction vessel. Properties of the polyblend are shown in Table V.

TABLE V

| Polyblend | Izod impact strength (ft. lbs./in. notch) | Tensile strength at fail (p.s.i.) | Elongation at fail (percent) |
| --- | --- | --- | --- |
| H-1 | 12.6 | 6,850 | 116 |
| H-2 | 21.1 | 5,540 | 117 |

EXAMPLE VI

Blend 80 parts of a vinyl chloride-vinyl acetate (85:15) copolymer with 20 parts of EVA (40:60) having a weight average molecular weight of 80,000. The polyblend has an Izod impact strength of 2.4 ft. lbs./in. of notch, compared to 0.26 ft. lbs./in. of notch for the vinyl chloride-vinyl acetate copolymer itself.

EXAMPLE VII

Blend 70 parts of PVC with 30 parts of an EVA (40:60) having a weight average molecular weight of 80,000. Injection mold the polyblend at 8000 p.s.i. and 175° C. to form a clear, homogeneous, rubbery product which has a tensile strength of 632 p.s.i. at fail and a $T_f$ of −15.5° C.

EXAMPLE VIII

Blend 50 parts of PVC with 50 parts of EVA (25:75) having a specific viscosity of 0.116 and with 1 part of tin mercaptide stabilizer by milling for 30 minutes. Mold the polyblend to form a fairly transparent, flexible material having a tensile strength of 1480 p.s.i. at fail, an elongation of 285% at fail, and a flexural strength of 108 p.s.i. at yield.

EXAMPLE IX

Blend 85 parts of PVC with 15 parts of EVA (30:70), 30 parts of dioctyl phthalate, and 1 part of tin mercaptide stabilizer. The clear, transparent moldings obtained from the polyblend have a tensile strength of 2075 p.s.i. at fail, an elongation of 370% at fail, and a flexural strength of 133 p.s.i. at yield.

VINYL CHLORIDE POLYMERS

The vinyl chloride polymers which are blended with ethylene-vinyl acetate copolymers in the practice of the invention are polymers consisting of 85–100% by weight of combined vinyl chloride and up to 15% by weight of one or more combined copolymerizable monomers, e.g., vinyl acetate, vinylidene chloride, diethyl maleate, diethyl fumarate, etc. The invention is particularly applicable to the modification of vinyl chloride polymers having weight average molecular weights of 50,000–500,000.

ETHYLENE-VINYL ACETATE COPOLYMERS

The solid ethylene-vinyl acetate copolymers employed in the practice of the invention consist essentially of 15–85% by weight of combined ethylene and 85–15% by weight of combined vinyl acetate. These copolymers, which can be prepared by any conventional technique, should have weight average molecular weights of 15,000–500,000, preferably 50,000–200,000. The copolymers having combined vinyl acetate contents of 35–85% are particularly advantageous in that they are more compatible with vinyl chloride polymers and, therefore, are more easily blended therewith.

POLYBLENDS

The vinyl chloride polymers and solid ethylene-vinyl acetate copolymers can be blended by any technique which effects a sufficiently intimate admixture of the polymers, e.g., by hot or cold mill rolling. Banburying, recovering the polymers from mixed dispersions thereof, polymerizing vinyl chloride in the presence of preformed ethylene-vinyl acetate copolymer, etc. Graft copolymerization is a particularly suitable method of blending vinyl chloride polymers and the less compatible ethylene-vinyl acetate copolymers, i.e., the copolymers having the lower vinyl acetate contents.

The proportions in which the vinyl chloride polymers and solid ethylene-vinyl acetate copolymers are blended varies with the particular ethylene-vinyl acetate copolymer employed, and with the type of polyblend desired. Ordinarily, when a rigid product is desired, 70–99 parts by weight of the vinyl chloride polymer are blended with, correspondingly, 30–1 parts by weight of a solid ethylene-vinyl acetate copolymers having a combined vinyl acetate content of 15–60% by weight. The flexible polyblends are usually prepared by blending 50–70 parts by weight of the vinyl chloride polymer with, correspondingly, 50–30 parts by weight of a solid ethylene-vinyl acetate copolymer having a combined vinyl acetate content of 60–85% by weight.

As will be obvious to those skilled in the art, these proportions can be varied without departing from the scope of the invention, especially when an ethylene-vinyl acetate copolymer normally used in flexible blends is employed in a rigid blend, or a copolymer normally used in rigid blends is employed in a flexible blend, or a co-plasticizer is to be incorporated into the vinyl chloride polymer/ethylene-vinyl acetate copolymer blend, etc. As a rule, the polymers should be blended in such proportions that the polyblends comprise 50–99 parts by weight of the vinyl chloride polymer and, correspondingly, 50–1 parts by weight of the ethylene-vinyl acetate copolymer.

Optional additives, such as stabilizers, fillers, colorants, processing aids, lubricants, co-plasticizers, etc., can be incorporated into the polyblends if desired. These additives, when incorporated, should be employed in such amounts that the vinyl chloride polymer/ethylene-vinyl acetate copolymer blend constitutes at least about 50% by weight of the total composition.

Among the processing aids and co-plasticizers suitable for incorporation into the polyblends are, e.g., styrene-acrylonitrile copolymers, styrene-methyl methacrylate copolymers, alkyl phthalates (e.g., dibutyl phthalate, diamyl phthalate, dioctyl phthalate, di(2-ethylhexyl)phthalate, etc.), trialkyl and triaryl phosphate (e.g. tributyl phosphate, trioctyl phosphate, tricresyl phosphate, etc.), dialkyl adipates and sebacates (e.g., dihexyl sebacate, dioctyl adipate, etc.), methyl phthalyl ethyl glycollate, ethyl phthalyl ethyl glycollate, butyl phthalyl butyl glycollate, etc.

The products of the invention are rigid, semi-rigid, and flexible polyblends which are useful in preparing rigid sheets, tubes, and molded objects having high impact strength or flexible products such as garden hose, film, etc. They can be processed more easily than vinyl chloride polymers because of the presence of the ethylene-vinyl acetate copolymers. The ethylene-vinyl acetate copolymers having higher vinyl acetate contents are so compatible with vinyl chloride polymers that the polyblends employing them are clear and transparent. This gives the flexible polyblends of the invention an advantage over polyblends comprising vinyl chloride polymers and conventional polymeric plasticizers. Advantages which the ethylene-vinyl acetate copolymers have over non-polymeric plasticizers are low volatility, low extractability, and good age resistance.

It is obvious that many variations can be made in the products and processes set forth above without departing from the spirit and scope of this invention.

What is claimed is:

1. A blend comprising 50–99 parts by weight of a vinyl chloride polymer consisting of 85–100 percent by weight of combined vinyl chloride and 0–15 percent by weight of at least one combined copolymerizable monomer and, correspondingly, 50–1 parts by weight of a solid ethylene-vinyl acetate copolymer having a combined vinyl acetate content of 15–85% by weight.

2. A blend as in claim 1 wherein the vinyl chloride polymer is polyvinyl chloride.

3. A blend as in claim 1 wherein the ethylene-vinyl acetate copolymer has a weight average molecular weight of 15,000–200,000.

4. A blend as in claim 1 wherein the ethylene-vinyl acetate copolymer has a combined vinyl acetate content of 35–85% by weight.

5. A blend comprising 70–99 parts by weight of a vinyl chloride polymer consisting of 85–100 percent by weight of combined vinyl chloride and 0–15 percent by weight of at least one combined copolymerizable monomer and, correspondingly, 30–1 parts by weight of a solid ethylene-vinyl acetate copolymer having a combined vinyl acetate content of 15–60% by weight.

6. A blend comprising 50–70 parts by weight of a vinyl chloride polymer and, correspondingly, 50–30 parts by weight of a solid ethylene-vinyl acetate copolymer having a combined vinyl acetate content of 60–85% by weight.

7. A homogeneous vinyl chloride resin composition comprising poly(vinyl chloride) resin and, blended therewith, from about 10 percent to about 20 percent by weight based upon said resin composition of an ethylene-vinyl acetate copolymer resin, containing from about 15 percent to about 35 percent by weight of the vinyl acetate component.

8. A homogeneous vinyl chloride resin composition comprising poly(vinyl chloride) resin and, blended therewith, from about 10 percent to about 20 percent by weight based upon said resin composition of an ethylene-vinyl acetate copolymer resin containing about 35 percent by weight of the vinyl acetate component.

9. A homogeneous vinyl chloride resin composition comprising poly(vinyl chloride) resin and, blended therewith, from about 10 percent to about 20 percent by weight based upon said resin composition of an ethylene-vinyl acetate copolymer resin containing from 30 percent to about 35 percent by weight of the vinyl acetate component.

10. A homogeneous vinyl chloride resin composition comprising poly(vinyl chloride) resin and, blended therewith, about 20 percent by weight based upon said resin composition of an ethylene-vinyl acetate copolymer resin containing about 35 percent by weight of the vinyl acetate component.

11. A graft copolymer comprising vinyl chloride grafted onto a copolymer of ethylene and 20 to 80 percent by weight of vinyl acetate and the ratio by weight of vinyl chloride to said ethylene/vinyl acetate copolymer in said graft copolymer being 1.0 to 99 parts by weight of vinyl chloride for each part by weight of said ethylene/vinyl acetate copolymer.

12. The graft copolymer of claim 11 wherein said ethylene/vinyl acetate copolymer has a molecular weight of 15,000 to 500,000.

13. The graft copolymer of claim 11 wherein said ratio by weight is from 85 to 96 parts by weight of vinyl chloride for each part by weight of said ethylene/vinyl acetate copolymer.

14. A graft copolymer comprising vinyl chloride grafted onto a copolymer of ethylene and vinyl acetate, said ethylene/vinyl acetate copolymer containing from 20–80% by weight of vinyl acetate and said graft copolymer containing from 4–50% by weight of ethylene/vinyl acetate copolymer.

15. The graft copolymer of claim 14 wherein said ethylene/vinyl acetate copolymer has a molecular weight of 15,000 to 500,000.

16. The graft copolymer of claim 14 wherein said graft copolymer contains from 4–15% by weight of ethylene-vinyl acetate copolymer.

17. The graft copolymer of claim 14 wherein said graft copolymer contains from 15–50% by weight of ethylene/vinyl acetate copolymers.

18. A polymerization blend comprising 50–99 parts by weight of a vinyl chloride polymer consisting of 85–100 percent by weight of combined vinyl chloride and 0 to 15 percent by weight of at least one combined copolymerizable monomer and 50–1 parts by weight of solid ethylene/vinyl acetate copolymer having a combined vinyl acetate content of 15–85 percent by weight, at least a portion of said vinyl chloride being grafted upon said ethylene/vinyl acetate copolymer.

19. A process for producing vinyl chloride polyblends comprising admixing 1–50 parts by weight of a solid ethylene/vinyl acetate copolymer having a combined vinyl acetate content of 15–85 percent by weight with 99–50 parts by weight of a vinyl chloride monomer formulation containing 85–100 percent by weight of vinyl chloride and 0–15 percent by weight of a polymerizable monomer and polymerizing said vinyl chloride monomer formulation in said admixture to form vinyl chloride polymer, at least a portion of which is grafted upon said ethylene/vinyl acetate copolymer.

References Cited
UNITED STATES PATENTS

| 2,520,959 | 9/1950 | Powers | 260—45.5 |
| 2,543,229 | 2/1951 | Chapman | 260—45.5 |
| 2,733,228 | 1/1956 | Slayer et al. | 260—45.5 |

SAMUEL H. BLECH, Primary Examiner

M. J. TULLY, Assistant Examiner

U.S. Cl. X.R.

260—31.6, 31.8, 876, 897